United States Patent [19]

Mendelson

[11] 4,308,621
[45] Dec. 29, 1981

[54] RADIO INTERFERENCE BUCKER APPARATUS

[76] Inventor: Jerry M. Mendelson, 5502 Corteen Pl., Apt. 101, North Hollywood, Calif. 91607

[21] Appl. No.: 939,008

[22] Filed: Sep. 1, 1978

[51] Int. Cl.³ .............................................. H04B 1/12
[52] U.S. Cl. ................... 455/278; 455/284; 455/304; 333/162
[58] Field of Search ............... 325/369, 367, 366, 371, 325/377, 378, 388, 436, 473, 474, 475, 476; 333/138, 139, 140, 144, 148, 156, 162, 163; 455/283, 284, 286, 278, 276, 304, 222, 223, 224, 225

[56] References Cited

U.S. PATENT DOCUMENTS

| | | | |
|---|---|---|---|
| 2,028,841 | 1/1936 | Murray | 325/305 |
| 2,225,524 | 12/1940 | Percival | 325/371 |
| 2,892,162 | 6/1959 | Bennett | 333/156 |
| 2,925,960 | 2/1960 | Clauss | 333/156 |
| 3,256,487 | 6/1966 | Sinninger | 325/371 |
| 3,277,391 | 10/1966 | Berstein | 333/163 |
| 3,357,018 | 12/1967 | Villard, Jr. | 325/369 |
| 3,740,673 | 6/1973 | Bernstein | 333/163 |
| 3,956,699 | 5/1976 | Leahy | 325/369 |
| 4,075,566 | 2/1978 | D'Aracangelis | 325/269 |

FOREIGN PATENT DOCUMENTS

| | | | |
|---|---|---|---|
| 946071 | 5/1949 | France | 333/156 |
| 1108691 | 3/1977 | Japan | 455/278 |

Primary Examiner—Robert L. Richardson
Assistant Examiner—Tommy P. Chin
Attorney, Agent, or Firm—Harry R. Lubcke

[57] ABSTRACT

An apparatus for intercepting radio waves emitted from a relatively local interference radio-wave-emitting source and processing the same so that they may be fed into the antenna terminal of a radio wave receiver for accomplishing substantially interference-free reception of distant radio wave stations. An antenna suited for only local reception provides the interfering radio wave energy to the bucker apparatus. Therein it is amplified a selected amount and the phase thereof altered by a continuously adjustable delay means to accomplish the desired cancellation of interference by phase opposition of the interfering signal from the bucker with respect to the interfering signal as it is received at the antenna terminal of the radio wave receiver.

9 Claims, 3 Drawing Figures

RADIO INTERFERENCE BUCKER APPARATUS

BACKGROUND OF THE INVENTION

This invention pertains to radio-wave receiving apparatus, and particularly to apparatus for canceling radio-wave interference.

The so-called "Collins system" utilizes a second antenna tuned to a frequency away from the band of frequencies sought to be received to intercept bursts of interference that hopefully also affects reception within the wanted band of frequencies.

The radio-wave energy from the second antenna is detected to an audio frequency, typically, and then a value of direct current of corresponding amplitude is formed.

This direct current is fed into the intermediate frequency amplifier of the main receiver in such polarity as to reduce the amplification of the interference-experiencing intermediate frequency amplifier to substantially zero.

Unfortunately, the wanted signal as well as the interfering signal is thereby eliminated from the output of the main receiver for the duration of the burst of interference.

In the early 1960's a so-called "Range Extender" circuit was adapted from television practice for communications noise-cancelling. However, only one antenna was used and the phase-reversing noise-cancelling device was merely a shunt circuit in the single antenna lead-in.

Again, but for a different reason than that given above, the wanted signal as well as the interfering signal is eliminated.

The simple amplitude-limiter at any point in the main receiver to limit interference to approximately the maximum level of the desired signal, is also known. However, the removal of the interference is only partial and only for interference having an amplitude of greater than the desired signal.

SUMMARY OF THE INVENTION

In essence, a phase opposition channel is established *only* with respect to the radio-wave interference affecting the main radio-wave receiver.

This channel has a relatively small antenna positioned to intercept largely only the interfering signal and not the wanted signal.

The channel further includes means to tune to the same radio frequency as the desired signal and to amplify that radio frequency energy.

Also included are means to reverse the phase of the radio-wave interfering energy and to adjust the amplitude of that energy to exactly cancel the incoming radio-wave interfering energy at the antenna terminal of the radio-wave receiver.

A radio frequency radio-wave continuously adjustable delay solenoid coil device is included to allow the 180° cancelation to be manually accomplished.

DESCRIPTION OF THE PREFERRED EMBODIMENTS

Figure 1:
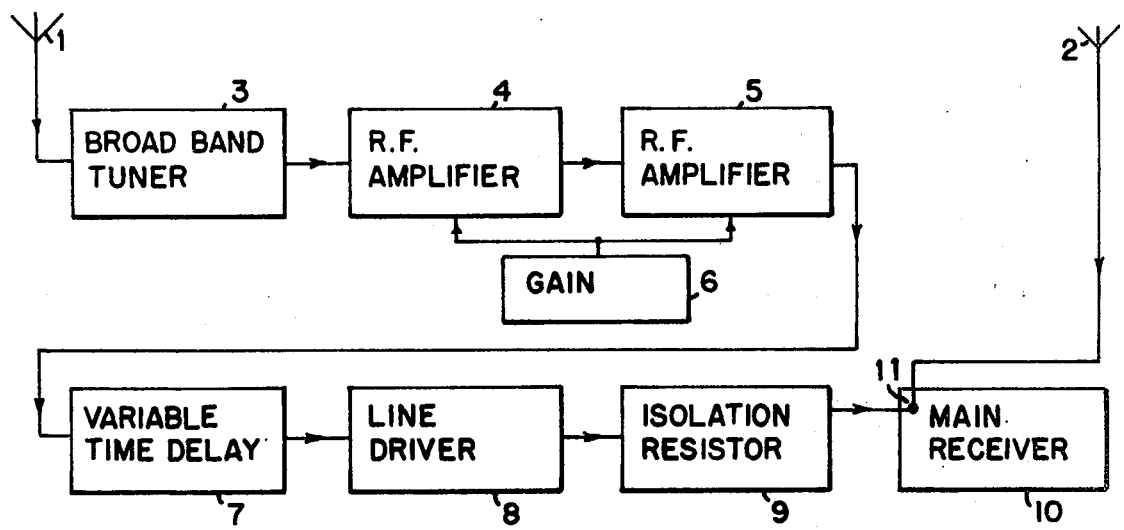
FIG. 1 is a block diagram of the complete combination of main radio-wave receiver and the radio interference bucker apparatus.

In FIG. 1, numeral 1 identifies an interference pickup antenna. This antenna is typically shorter and closer to the earth (ground) than the radio-wave receiver antenna 2.

Antenna 1 may be three meter long piece of insulated wire lying upon the floor (perhaps under the carpet) within the room housing the receiving apparatus.

The length, location and orientation of antenna 1 can best be determined by experiment, in which reception of the interfering radio-wave energy is maximized with respect to the wanted signal.

A broad-band tuner 3 is connected to interference antenna 1. It may have multiple tuned circuits for resonating at any of the radio frequencies desired to be received interference-free on the main receiver.

A first radio-frequency amplifier 4 is connected to tuner 3. It may employ a field-effect transistor (FET), with provision for adjusting the gain.

A second radio-frequency amplifier 5 is connected to amplifier 4 and is a duplicate of it.

Gain control 6 coacts with both amplifier 4 and 5 to adjust the gain thereof.

The output of the second amplifier connects to variable time delay device 7. Briefly, this device shifts the radio frequency interference radio-wave energy by 180°, for the purpose of later effecting cancelation of the interference.

Line driver 8 receives the phase-reversed radio-wave energy from device 7. It amplifies the power thereof and reduces the impedance thereof in order to drive a length of coaxial cable.

Isolation resistor 9 provides the phase-reversed energy to the main radio-wave receiver 10, at the usual antenna terminal 11 without altering the impedance at that terminal.

Figure 2:
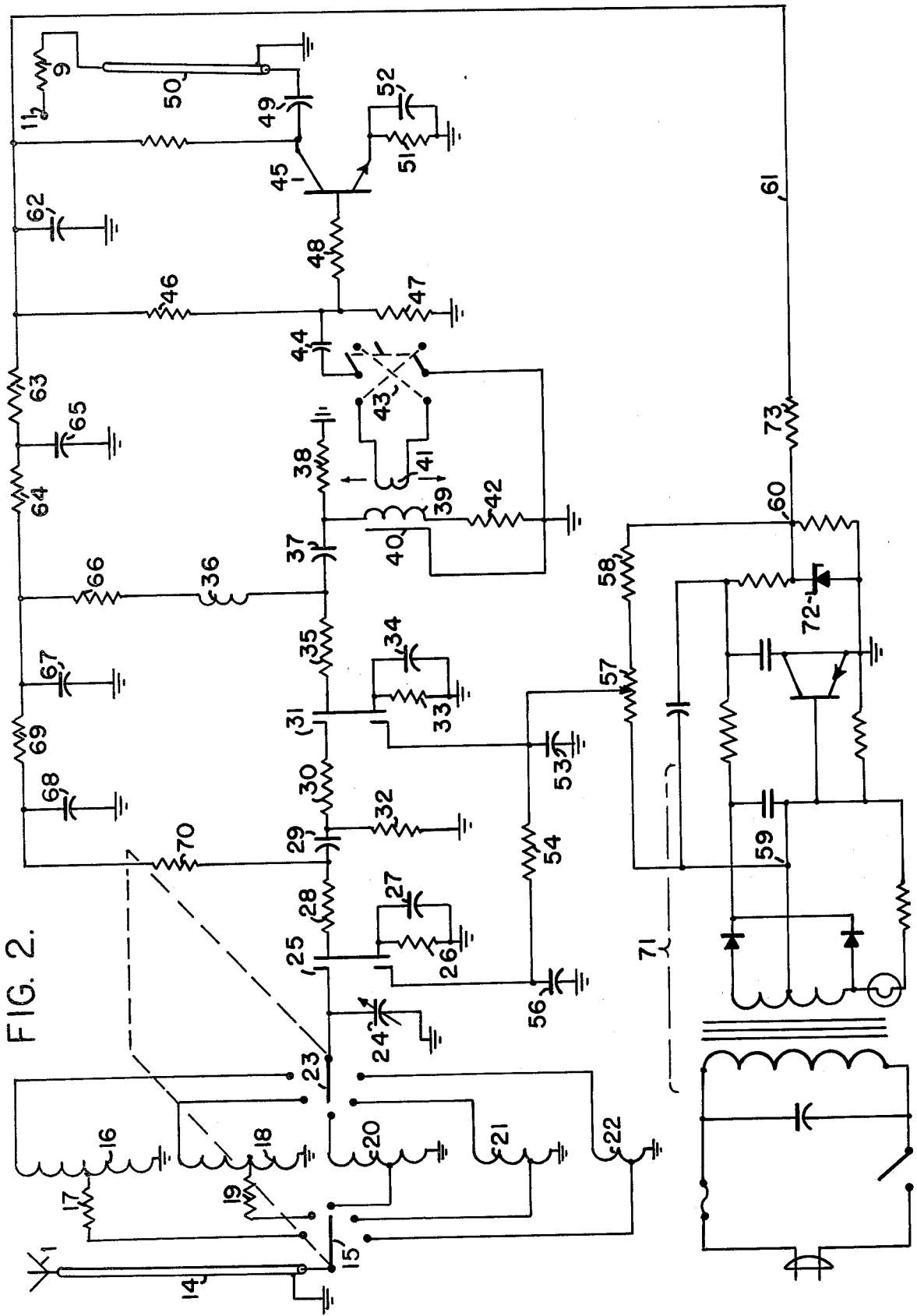
FIG. 2 is a schematic wiring diagram of the phase-opposition channel.

In FIG. 2, element 1 is the interference pickup antenna, as in FIG. 1. A coaxial cable 14 is preferably leads the interference radio-frequency energy from the antenna to the antenna section of a band change switch 15, the wiper thereof. The coaxial cable may be of the 58A/U type, about 3 meters or more long, with the outer conductor thereof grounded at the switch end.

The radio interference bucker apparatus of this invention is operative at essentially any radio frequency within the known spectrum. Since the bucking takes place at radio frequency it is of little concern whether the modulation of the radio wave is for code, speech, music, television or computer communication.

As an example, speech communication on five amateur bands will be detailed.

Accordingly, inductor (coil) 16 may be for tuning in the 80 meter band, in a commercially available set of tuning coils. Resistor 17 is in the connection from sswitch 15 to the antenna tap on coil 16. The function of the resistor is antenna broad-banding (and "Q"-lowering). It prevents the antenna and the input circuit components from being sharply resonant at one frequency, and also reduces any tendency for oscillation or excessive positive feedback between input and output circuits. A resistance value of 390 ohms is satisfactory.

Coil 18 is suited to tune over the 40 meter band and resistor 19 performs the same function therewith as resistor 17 does with coil 16. A value of 120 ohms is satisfactory.

In a similar manner, coil 20 is connected to the third contact on switch 15, and is suited to tune over the 20 meter band. A damping resistor is not required.

Coil 21 is like coil 20, except that it is suited to tune over the 15 meter band.

Likewise, coil 22 is like coil 21, except that it is suited to tune over the 10 meter band.

Switch 23 is the ganged companion to switch 15.

Elements 15 through 23 comprise tuner 3, with the addition of variable capacitor 24, which is connected from switch 23 to circuit (chassis) ground, to be in shunt with whatever coil is in circuit.

The elements of amplifier 4 are next in order.

Transistor 25 is preferably of the field-effect type. The upper gate is the input and is connected to the inductor-capacitor combination 23-24. The lower gate is employed for gain control.

The drain is the output. One connection thereto is to resistor 26 and therethrough to ground. This sets the minimum gate bias. A resistance of 120 ohms is satisfactory.

Capacitor 27 shunts resistor 26 to maintain the FET source at radio frequency ground. A capacitance of 0.004 microfarads (uf) is satisfactory.

Resistor 28 couples the output from first amplifier 4 to the input of second amplifier 5; it is also anti-parasitic. A resistance of 15 ohms is suitable. The amplifiers are connected in cascade.

Capacitor 29 is in series with resistor 28 and couples the radio-frequency a.c. signal to the second amplifier, while allowing the d.c. potential on the FETs to be as required. A capacitance of 0.004 uf is suitable.

Resistor 30, in series to the upper gate of second FET 31, is also an anti-parasitic oscillation element, as was resistor 28, and may have a resistance of 15 ohms.

Resistor 32 is connected between the upper gate of second FET 31 and ground. It maintains the gate at a suitable d.c. potential, while not shorting out the signal. A resistance of 20,000 ohms is suitable.

As before, resistor 33 connects the source of FET 31 to ground to set the minimum gate bias, and to reduce degeneration or instability. A resistance of 120 ohms is satisfactory.

Capacitor 34 shunts resistor 33 to maintain the source at radio-frequency ground. A capacitance of 0.004 uf is satisfactory.

Resistor 35 is in series from the drain element of FET 31 for an anti-parasitic connection to subsequent apparatus. A resistance of 15 ohms is suitable.

Radio-frequency choke 36 connects from power supply circuits to the drain of FET 31, to energize the same and to prevent radio-frequency energy from entering the power supply circuits.

As before, capacitor 37 connects the radio-frequency a.c. signal from the output of amplifier 5 to the input of variable time delay device 7 (FIG. 1).

Resistor 38 represents part of the input impedance to variable time delay device 7. A resistance of 6,000 ohms is suitable. The output impedance of FET 31 comprises the other part of the input impedance. This is arranged so that a nominal impedance match is obtained between the incoming circuit and the variable time delay device.

In FIG. 2, device 7 is represented by solenoid coil 39, distributed capacitance 40 purposely associated therewith, and mechanically adjustable pickup coil 41.

The top end of solenoid 39 is connected to capacitor 37, while the bottom thereof is connected to ground through resistor 42. The latter may have a resistance of 1,800 ohms, and may be termed a line terminating resistor.

The parameters of device 7 will be later set forth.

Reversing switch 43 connects pickup coil 41 to the further part of the circuit in either of two polarities. In practice, this switch provides an option for the operator in radically shifting the noise cancelation null along the length of solenoid 39. This is of value when the null occurs inconveniently close to an end of the solenoid.

Capacitor 44 couples the output of time-delay, phase-shifter device 7 to line driver 8. A capacitance of 100 picofarads (pf) is sufficient. As before, this passes the signal without affecting the bias voltage on the line driver transistor 45.

A positive bias is provided for the base of transistor 45 by resistors 46 and 47. The former connects between a source of positive d.c. voltage and the base, while the latter connects between the base and ground. Resistances of 27,000 and 10,000 ohms, respectively, are suitable.

Resistor 48 couples capacitor 44 to the base of transistor 45. This resistor is for anti-parasitic purposes, and a resistance of 15 ohms is suitable.

Line driver transistor 45 is employed to increase the energy level of the processed interference signal and to lower the impedance to allow use of a coaxial cable output. The transistor may be of the family 2N3563, being of the bipolar type.

Output capacitor 49 is connected from the collector of the transistor to the inner conductor of the coaxial cable. A capacitance of 0.015 uf is suitable.

Output coaxial cable 50 is nominally of low impedance, such as 50 ohms of the 58A/U type. The length thereof may be as required, but a half-meter is convenient. The outer conductor is grounded.

Resistor 51 is connected between the emitter of transistor 45 and ground to set a minimum bias on the base thereof. A resistance of 220 ohms is suitable.

Capacitor 52 is in shunt to resistor 52 to minimize degeneration and stabilize the operation of the transistor. A capacitance of 0.1 uf is suitable.

Resistor 9 is in series with the inner conductor of coaxial cable 50 at the far end thereof. This is for isolation, to minimize loading upon the antenna terminal of the main radio-wave receiver, to which it is connected; being terminal 51. A resistance of 270 ohms is suitable. Terminal 11 is also shown in FIG. 1.

Returning to the amplifier circuits, capacitors 56 and 53 and resistor 54 comprise a decoupling filter for retaining the lower control gate of FET 25 at ground for the signal that is handled and avoiding deleterious feedback problems between amplifiers 4 and 5.

Capacitor 56 connects the control gate of FET 25 to ground and capacitor 53 connects the control gate of FET 31 to ground. A capacitance of 0.004 uf is suitable for each.

Resistor 54 is connected between the two control gates. A resistance of 120 ohms is suitable.

A known a.c. to d.c. power supply is generally designated by 71 in FIG. 2.

Potentiometer 57 and fixed resistor 58 are connected in series from the negative terminal 59 and the positive terminal 60 of the power supply, for the purpose of allowing adjustment of the gain of the amplifiers by adjustment of the bias on the gates.

Potentiometer 57 may have a total resistance of 10,000 ohms and resistor 58 a resistance of 18,000 ohms. This combination limits the maximum positive bias on the gates.

Power supply 71 provides approximately 12 volts d.c. for the collector and drain power supply line 61.

Capacitor 62 is connected from line 61 to ground for the purpose of minimizing radio-frequency coupling between amplifier stages 4 and 5 particularly. A capacitance of 0.1 uf is suitable.

Resistors 63 and 64 are connected in series in power supply line 61, with capacitor 65 connected from between the two to ground to form a radio-frequency inhibiting filter to de-couple the radio frequency stages 4 and 5 from the remainder of the apparatus. A resistance of 120 ohms for each of the resistors and a capacitance of 0.004 uf for the capacitor are suitable values.

Resistor 66 is connected from essentially power supply line 61 and radio-frequency choke 36 in order to lower the "Q" of the choke for broadening the bandwidth. A resistance of 810 ohms is suitable.

A second radio-frequency inhibiting filter to de-couple radio-frequency amplifier 4 from radio-frequency amplifier 5 is formed of capacitors 67 and 68 and intervening resistor 69. The capacitors are connected from each side of extended power supply line 61 to ground, with respect to resistor 69. A capacitance of 0.004 uf for each of the capacitors and a resistance of 120 ohms for the resistor are suitable values.

An isolating and slight voltage dropping resistor 70 is connected to the drain of FET 25 through resistor 28. A resistance 810 ohms for resistor 70 is suitable.

Zener diode 72 sets the voltage of the output of the power supply 71 and connected thereto through circuit point 60 is power line de-coupler resistor 73. A resistance of 120 ohms is satisfactory for resistor 73.

Figure 3:
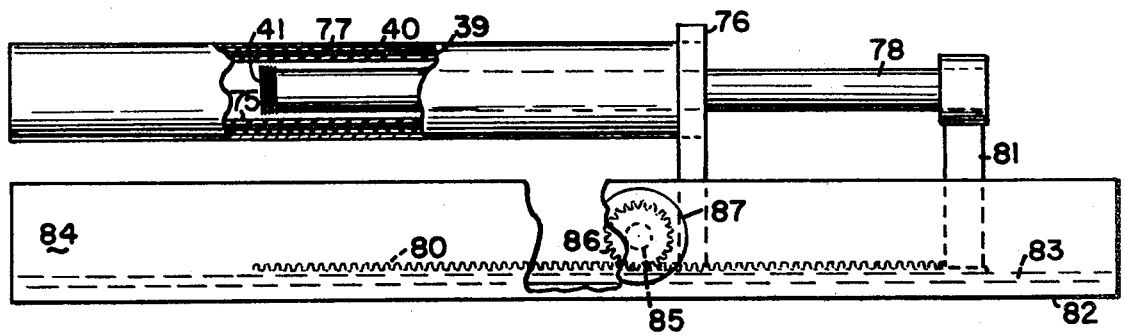
FIG. 3 is a showing of the essential physical elements of the continuously adjustable radio-wave delay means, used for effecting the 180° cancelation of interference.

FIG. 3 shows an embodiment of elements 39, 40 and 41 of FIG. 2.

The purpose of the embodiment is to provide a smooth mechanical adjustment between inductors 39 and 41 by moving pickup coil 41, so that the operator can accomplish the important null of the interference by a front of panel adjustment.

For the frequency band postulated in connection with broad band tuner 3 of FIG. 1, solenoid coil 39 is formed of approximately 900 turns of No. 38 AWG enameled wire, close wound upon a 1.3 cm form, 75. The form is formed of a suitable insulator, such as a round Lucite plastic tube, 11.5 cm long. The winding starts 3 millimeters (mm) from one end of the form and is completed about 1.3 cm from the other end. This allows a stationary mounting of the solenoid by support 76.

Over the whole length of the solenoid two layers of #12 Kraft paper is wrapped to provide the dielectric for the elements 39–40 relationship; being element 77 in FIG. 3.

Around that a metallic shield 40 is wrapped. This shield is split by preventing the ends of the wrap from touching by a separation of about 1 mm. This eliminates an unwanted shorted-turn effect.

The distributed capacitance desired for the delay line is provided by the wire winding of the solenoid considered as a metallic surface in relation to metallic shield 40 through dielectric 77.

This embodiment provides approximately 360° phase shift; i.e., 1 hertz at the lowest frequency in the frequency bands initially mentioned. The desired phase opposition, 180°, is thus obtainable for canceling the interference.

Pickup coil 41 is of very small inductance with respect to that of solenoid 39. It is typically movable axially within the solenoid.

In order to accomplish this five turns of #30 AWG enameled wire may be wound on a tube or rod of plastic or wood approximately 8 mm in diameter. This is at one end of the support-for-winding 78, the total length thereof being conveniently about 12 cm, to allow for mechanical support and mechanical coupling to the mechanical phase-adjusting structure.

The coil form for pickup coil 41 is attached to gear rack 80 through the intermediary of riser 81. The coil form is attached to the riser and the riser to rack by suitable fastenings, as machine screws engaging tapped holes in the members.

The gear rack may have approximately 4 teeth per centimeter of length, a cross-section of 5 mm by 5 mm, and a length of 11.5 cm.

A base 82 may be fabricated of a smoothly machinable aluminum, in which is milled a slotted recess the length thereof, having a cross-section of 5 mm wide by about 2.5 mm deep, identified as 83.

The base also has an "L" shaped front, which may be an angle shape in one piece, or two flat pieces fastened together. The purpose of the vertically disposed front piece is to act as a mechanical bearing, or the support for a mechanical bearing, for shaft 85. The front is identified as 84.

Shaft 85 carries pinion gear 86 so as to engage rack 80 at all times. About a 1½ to 1 ratio of pinion to rack, as to the number of pinion teeth, is preferred.

A front of panel knob 87 is used to conveniently translate pickup coil 41 to the null with respect to the interfering signal.

Flexible leads from movable coil 41 attach to stationary terminals for connection to the remainder of the circuit.

Specific values for capacitors and resistors have been given herein to fully teach the invention. These values may be departed from up to plus or minus 20% without affecting the performance of the invention.

I claim:

1. In combination with a radio-wave receiver having a connected antenna (2) that intercepts a desired radio-wave and also a local interference radio wave, radio interference bucker apparatus comprising;
    (a) a separate antenna (1) disposed significantly closer to the earth relative to said connected antenna to intercept substantially only the local interference radio-wave causing said interference,
    (b) only broad-band tuning means responsive to said local interference radio-wave connected to said separate antenna,
    (c) only amplifying means (4,5) directly responsive to said local interference radio-wave at the incoming frequency of that radio-wave, connected to said tuning means,
    (d) a separate-coil continuously adjustable delay means (7) having outer and inner coils responsive to said interference radio-wave connected to said amplifying means to alter the phase of said interference radio-wave, upon said inner coil being moved,
    (e) a shield (40) surrounding said outer coil, and
    (f) circuit means (8,9) connected to said adjustable delay means and to said connected antenna to impress upon said radio-wave receiver an interference radio-wave of opposite phase to that intercepted by said connected antenna.

2. The combination of claim 1 which additionally includes;
   (a) gain amplitude adjusting means (57) coactive with said amplifying means to allow a selected amplitude of said interference radio-wave to be impressed upon said adjustable delay means.

3. The combination of claim 1 which additionally includes;
   (a) circuit polarity reversing means (43) interposed between said adjustable delay means and said circuit means, to reverse the phase of the interference radio-wave that has traversed said adjustable delay means.

4. The combination of claim 1, in which said circuit means includes;
   (a) line driver means (45) to increase the energy level of the interference signal and to lower the impedance of the circuit.

5. The combination of claim 1, in which said amplifying means includes;
   (a) plural amplifiers (4,5) connected in cascade, and
   (b) potentiometer means (57) connected in common to each of said amplifiers to adjust the gain thereof.

6. The combination of claim 1, in which said adjustable delay means is comprised of;
   (a) an elongated solenoid (39) to receive radio-wave energy,
   (b) capacitative means (40) externally electrically related to said elongated solenoid, and
   (c) a pickup coil (41) translatable in inductive relation to said solenoid to deliver radio-wave energy.

7. The delay means of claim 6, in which;
   (a) said pickup coil has a small fraction of the number of turns of said solenoid, and
   (b) said pickup coil is translatable inside of said solenoid.

8. The delay means of claim 6, which additionally includes;
   (a) support means (78,81) for said pickup coil,
   (b) rack means (80) mechanically connected to said support means, and
   (c) gear means (86) mechanically engaged to said rack means to allow translation of said rack means and consequently said pickup coil.

9. The combination of claim 1, in which;
   (a) said separate antenna (1) has a physical dimension that is a small fraction of that of said connected antenna.

* * * * *